United States Patent

Johansen et al.

[11] 3,881,521
[45] May 6, 1975

[54] DIMENSIONALLY STABLE, FLEXIBLE HYDRAULIC HOSE HAVING IMPROVED CHEMICAL AND TEMPERATURE RESISTANCE

[75] Inventors: Hans A. Johansen, Mantua; David D. Russell, Atwater, both of Ohio

[73] Assignee: Samuel Moore & Company, Mantua, Ohio

[22] Filed: Jan. 31, 1973

[21] Appl. No.: 328,367

[52] U.S. Cl.............................. 138/126; 138/130
[51] Int. Cl.............................. F16l 11/08
[58] Field of Search .......... 138/125, 118, 123, 124, 138/126, 129, 130, 137; 161/412; 264/209

[56] References Cited
UNITED STATES PATENTS

| | | | |
|---|---|---|---|
| 2,076,729 | 4/1937 | Kennedy | 138/126 |
| 3,253,618 | 5/1966 | Cook | 138/125 |
| 3,334,165 | 8/1967 | Koch | 138/125 X |

*Primary Examiner*—Jerry W. Myracle
*Attorney, Agent, or Firm*—Clelle W. Upchurch

[57] ABSTRACT

A dimensionally stable, flexible, hydraulic hose having an elastomeric core tube cross-linked by irradiation with ionizing electrons, a fibrous reinforcing layer surrounding the core tube which prevents the core tube from expanding with increase in pressure and a protective elastomeric sheath about the reinforced core tube.

14 Claims, 4 Drawing Figures

DIMENSIONALLY STABLE, FLEXIBLE HYDRAULIC HOSE HAVING IMPROVED CHEMICAL AND TEMPERATURE RESISTANCE

This invention relates generally to composite tubing and more particularly to a flexible, dimensionally stable reinforced hose adapted for transmission of fluids under pressure having both improved strength and improved temperature, oil, solvent and chemical resistance.

It has been proposed heretofore to manufacture hose adapted for transmission of fluids under pressure having an extruded elastomeric or plastic core tube, a fibrous reinforcing layer wound about the core tube and a protective sheath extruded over the fibrous layers. Such hoses are disclosed, for example, in U.S. Pat. Nos. 3,062,241 and 3,310,447. The disclosed hoses have a nylon or an elastomeric polyurethane core tube, a fibrous polyester reinforcing braid and a nylon or elastomeric polyurethane sheath. The disclosed hoses have been found to be particularly advantageous for transmitting fluids under relatively high pressure but have been found to be somewhat lacking in either flexibility or in chemical and temperature resistant characteristics.

It has been proposed to cross-link polymer compositions, such as those of polyethylene, polyvinyl chloride, ethylene-propylene polymers, styrene-butadiene rubber, neoprene and the like, by chemically initiated mechanisms. For example, cross-linking has been achieved by hydrogen abstraction from the polymer chain by peroxide decomposition or by ionic mechanisms as in chlorine abstraction - nitrogen quaternization cross-linking of neoprenes. Such cross-linking of plastic components of composite tubing has been successful. However, compounds containing chemical cross-linking agents, such as curatives, initiators, and/or accelerators, tend to be relatively unstable upon exposure to heat. The extrusion of such plastics has produced an intermediate tube having the disadvantage of insufficient integrity to be handled prior to cross-linking, and after crosslinking the presence of curative reaction products in the tube is undesirable.

A process for making a heat shrinkable tubing is disclosed in U.S. Pat. No. 3,253,619. This process involves extruding a core tube, applying a braid around the core tube and extruding a protective sheath over the braid. A loosely knitted braid is applied at a maximum of 40° angle with the longitudinal axis of the core tube to permit expansion of the tubing. The braided tubing is heated to expand it diametrically and cooled while thus expanded. Later, the tube may be heated to shrink it about the ends of conductors or for other purposes. The core tube must be free to move with respect to the braid to permit expansion and contraction.

It is therefore an object of this invention to provide an improved hose adapted to convey fluids under pressure. Another object of the invention is to provide a dimensionally stable, flexible, hydraulic hose having improved chemical and temperature resistance and having a core tube extruded from an elastomer, a taughtly woven or bias lapped fibrous reinforcing material wrapped about the core tube and a protective sheath covering the fibrous material. A more specific object of the invention is to provide a dimensionally stable, flexible, composite tube or hose having an extruded cross-linked elastomeric core tube, a tightly woven or lapped fibrous reinforcing layer and an extruded elastomeric sheath adapted to convey fluids under pressure under conditions of higher temperatures than the prior art reinforced thermoplastic composite tubes. A further object of the invention is to provide a hydraulic hose for conveying fluids under pressure which is oil resistant, chemical resistant and adapted for use at elevated temperatures. A still further object of the invention is to provide a method for making a novel flexible, dimensionally stable hydraulic hose having a cross-linked elastomeric core tube, a fibrous reinforcing layer and a protective sheath.

Other objects will become apparent from the following description with reference to the accompanying drawing in which FIG. 1 is a fragmentary step-wise cut-away view, partially in longitudinal section of one embodiment of the invention;

The foregoing objects and others are accomplished in accordance with this invention, generally speaking, by providing a dimensionally stable hydraulic hose adapted to convey fluids under pressure having a polymeric elastomer core tube cross-linked by ionizing radiation, a fibrous layer about the core tube which substantially reinforces the core tube against expansion under pressure, and a protective sheath about the fibrous layer. The fibrous reinforcing layer may be chemically bonded or grafted to the core tube through ionizing radiation induced cross-linking between elastomer of the core tube and the fibrous layer. The sheath may also be an elastomer which cross-links when exposed to ionizing radiation. The invention further provides a method for making a flexible, dimensionally stable hydraulic hose wherein a thermoplastic elastomer is extruded to form a self-supporting or integrous core tube, a fibrous reinforcing material is woven or lapped about the core tube under sufficient tension to limit the diametrical expansion of the core under pressure to less than 10 percent and a protective elastomeric sheath is extruded over the fibrous layer. The core tube is exposed to ionizing radiation until cross-linking of the thermoplastic elastomer with significant improvement in solvent, heat and chemical resistance. If only the elastomeric core tube is to be cross-linked, exposure to ionizing radiation may be before or after the fibrous layer and/or sheath have been disposed thereabout. If the fibrous layer is to be chemically bonded to the core tube, a coating of a compound in which cross-linking will occur upon exposure to ionizing radiation may be placed between the core tube and fibrous layer if desired and the assembly exposed to ionizing radiation either before or after the sheath has been extruded thereover. The core tube and an elastomeric sheath may be cross-linked simultaneously by exposure of the hose after its fabrication to ionizing radiation. An adhesive may be applied over the fibrous material before extrusion of the sheath to enhance grafting of the sheath to the fibrous layer when exposed to ionizing radiation.

Figure 1:
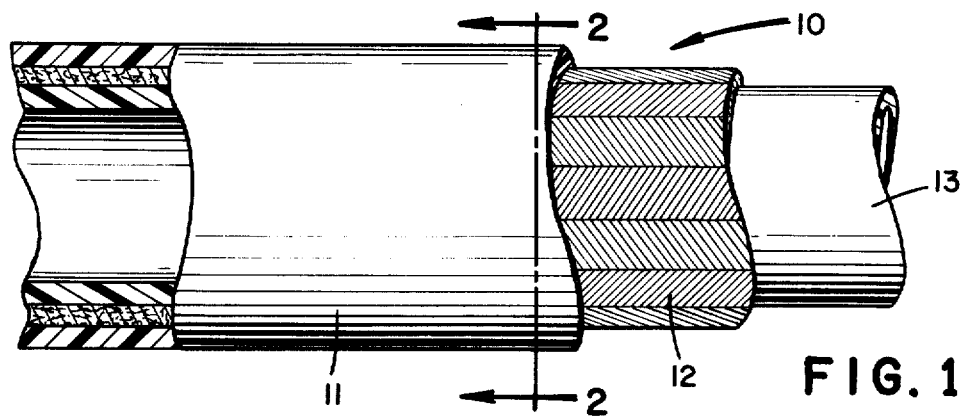
Figure 2:
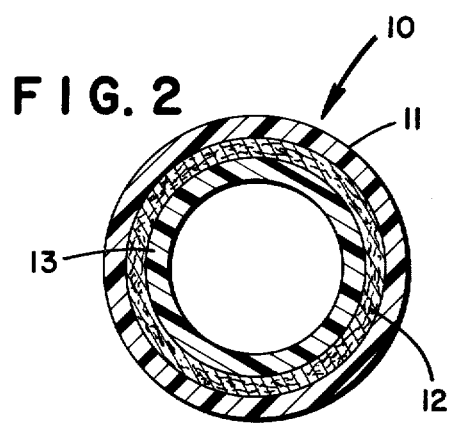
FIG. 2 is a cross-section taken along the line 2—2 of FIG. 1.
Figure 4:
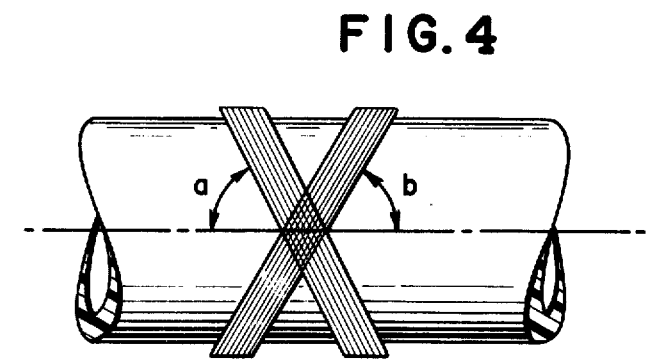
FIG. 4 is a diagramatic illustration of the reinforced core tube of an embodiment of the invention.

More specifically, the invention provides a flexible, dimensionally stable hydraulic hose having an extruded elastomeric core tube which has been cross-linked by irradiation with ionizing electrons and lapped or woven biased overlapping reinforcing fibers tautly wound about the core in opposite directions and at an angle in each direction of from about 50° to about 65° with the longitudinal axis of the core tube at a tension of from about 0.5 pounds to about 10 pounds per strand. The reinforcing fibrous layer covers at least about 85% of the surface of the core tube. Such a reinforcing layer prevents the core tube from expanding under pressures above atmospheric and at temperatures above −40°C. The placement of the fibers on the core tube is illustrated diagrammatically in FIG. 4 with angles $a$ and $b$ being the ones which are to be 50° to 65°.

It has been found that the physical properties of an elastomer such as, for example, its oil, chemical, and heat resistance are improved by exposure to alpha, beta, gamma, neutron, or other ionizing radiation. The irradiated elastomer is more solvent resistant and more resistant to effects of chemical attack. Ionizing radiation tends to reduce the thermoplastic properties of the elastomer until it ultimately has the properties usually associated with a thermoset resin or elastomer. The cross-linked elastomer is often referred to as a cured elastomer since it is no longer processable by practical thermoplastic processing techniques. The presently preferred method of effecting cross-linking of the elastomeric components of a hydraulic hose is by exposure to high energy electrons. Any suitable source of high energy electrons such as a Van de Graff accelerator, an insulating core transformer, a resonant transformer or a linear accelerator may be used to provide the high energy electrons. Preferably, the energy of the electrons should be at least about 100,000 electron volts and seldom will more than 15 million electron volts be required. Any dosage of high energy electrons will effect some improvement in the physical properties of the elastomer but best results have been obtained so far with an ionizing radiation with a total dosage of high energy electrons of at least about 5 megarads. The physical properties of the elastomer are usually improved sufficiently with a dosage of 15 megarads or less so seldom will it be necessary to expose the components of the hydraulic hose to a total dosage of more than 15 megarads. It is preferred that the required dosage be effected in one exposure but repeated exposures can be made until the desired total dosage has been obtained.

The invention provides the advantage that elastomeric compositions which are adapted to be extruded may be used to form the core tube or sheath and the properties of the extruded product may be improved to approach those normally associated with a thermoset resin by simply subjecting it to high energy electron radiation. A source of high energy electrons can be installed in conjunction with core extrusion, reinforcing operation or sheathing extrusion before winding of the hose on a reel. Alternately, the hydraulic hose can be subjected to irradiation at some later date.

Any elastomer which is processable by thermoplastic methods such as by extrusion and which, after irradiation with ionizing electrons has the desired chemical resistance, heat resistance and other properties may be used to make the core tube. For example, a suitable thermoplastic polyester urethane, a poly(alkylene ether) urethane, poly(alkylene thioether) urethane or poly(butadiene) urethane composition may be used.

Any suitable saturated or unsaturated chain extender may be used in preparing the polyurethane. For example, thiodiglycol, 2-allyl 1,3-propane diol, butyne diol, trimethylol propane monomethacrylate, butene diol or the like chain extender may be used. The polyurethane may be prepared by known processing techniques and using conventional polyethers, polyesters and organic polyisocyanates including those disclosed, for example, in "Polyurethanes, Chemistry and Technology," Parts I and II by Saunders and Frisch, published by Interscience Publishers, copyright 1964, provided the reactants are selected to provide an elastomer adapted to be cross-linked by irradiation. An example of such a polyurethane elastomer is prepared by reacting a poly(ε-caprolactone)diol and butenediol with 4,4'-diphenylmethane diisocyanate until a solid non-porous polyurethane is formed and interrupting the reaction before the polyurethane is no longer extrudable. A polyester containing ethylenic unsaturation such as one prepared from acids including an unsaturated acid or one prepared with an unsaturated diol may be used. The sheath may also be formed by extruding one of the polyurethane elastomers. Best results are obtained in the irradiation cross-linking step if the polyurethane contains ethylenic or vinylic unsaturation, so such unsaturated polyurethanes are preferred for the core tube and sheath.

Another thermoplastic elastomer suitable for making the core tube and/or sheath is an ethylene-propylene-diene terpolymer (EPDM) composition. Any suitable diene such as ethylidene norbornene or cyclohexadiene may be used in preparing the terpolymer. Preferably the terpolymer should contain from about 40–90% ethylene, from about 50–10% propylene and from 3–5% diene. Suitable commercial ethylene-propylene-ethylidene norbornene polymers include "EPsyn" 40, "EPsyn" 40-A, "EPsyn" 55, "EPsyn" 70, "EPsyn" 70A, "EPsyn" 4506, "EPsyn" 5508, "EPsyn " 5509 and "EPsyn" 7506 sold by Copolymer Rubber and Chemical Corporation.

An elastomeric ethylene-propylene-1,4 hexadiene terpolymer composition may also be used. Suitable commercially available compositions are those sold by E. I. duPont de Nemours & Co. under the trademark "Nordel." Suitable commercially available elastomeric ethylene-propylene-methylidene terpolymers are the "Vistalons" sold by Enjay Chemical Company.

A reinforcing filler material such as, for example, carbon black, kaolin clay, calcinated clay, zinc oxide, aluminum silicate, lead oxide, talc or the like may be mixed with the elastomer to provide a composition which will produce a dimensionally stable or integrous core tube or sheath. Preferably, the composition contains about 1 part filler per 1 to 2 parts elastomer. The amount of filler used may be varied to provide an extruded core tube or sheath which is dimensionally stable at room temperature. Preferably, the filled elastomer should have a hardness of at least Shore A 45 and a tensile modulus of at least about 300 p.s.i. The filled product can be handled or stored without substantial undesirable distortion of the tube before it is exposed to radiation. In addition, polyethylene or other polymeric hardening and reinforcing agent may be used. A suitable plasticizer or processing aid may also be included in the composition to facilitate extrusion.

A halosulfonated polyethylene composition may also be used to make the core tube or protective sheath provided it is compounded with other materials to increase the tensile modulus and hardness required for dimensional stability. One of the above fillers may be used for this purpose. Chlorosulfonated polyethylene polymers sold under the trademark "Hypalon" by E. I. duPont de Nemours & Co. is a commercially available polymer which can be compounded to form an elastomer suitable for use in this invention.

Polyepichlorohydrin is another compound which can be used in making the core tube or sheath. This polyether is prepared by condensation of epichlorohydrin and is thermoplastic but it is not elastomeric. It can be blended or mixed with highly crystalline Neoprene, chlorosulfonated polyethylene, polyvinyl chloride or the like to produce an integrous polymer which is elastomeric and is extrudable.

Any other suitable extrudable elastomer may be used. "Elastomer" as used herein is a substance capable of being extended to twice its own length at 68°C. and on release of the stress returns with force to approximately its original length.

The core tube and/or sheath may be bonded to the braid through radiation induced grafts. An adhesive or a solvent for the core tube or sheath may be interposed between the core or sheath and braid to obtain intimate contact for grafting. For example, the core tube and braid may be bonded by applying a solvent such as N-methyl pyrolidone, dimethyl formamide or similar solvent for a thermoplastic polyurethane in accordance with the process disclosed in application Ser. No. 18,272 filed Mar. 10, 1970 by Richard A. Matthews. Alternately, the core tube may be adhesively bonded to the braid with an adhesive as described in U.S. Pat. No. 3,310,447. The adhesive may be any material which when applied between the core and braid or between the sheath and braid will cause adherence through primary or secondary molecular forces. It may be one of the adhesives disclosed in U.S. Pat. No. 3,310,447. It may be a polar solvent or an adhesive having for example, amide, urethane or urea groups for producing strong secondary bonds or it may be a solvent or adhesive which upon exposure to ionizing radiation produces highly reactive specie such as free radicals, cations or anions.

The elastomer used to extrude the core tube or sheath and the adhesive which binds the core tube or sheath to the fibrous layer may contain a material which sensitizes it to ionizing radiation. A compound containing aliphatic unsaturation such as diethylene glycol dimethacrylate, trimethylol propane trimethacrylate, m-phenylene dimaleimide or the like may be used as the sensitizer.

The presence of aliphatic unsaturation in the elastomer improves cross-linking by radiation so it is preferred that the elastomer contain aliphatic unsaturation. Elastomers which do not contain unsaturation may be cross-linked to some extent but cross-linking may be slower than that of an unsaturated elastomer. Suitable unsaturated polyurethane elastomeric compositions gel to the point where they are substantially insoluble in polar solvents at a dosage of about 10 megarads. The 50% and 100% modulus and the Shore hardness of the unsaturated thermoplastic polyurethane increase with exposure to electron radiation.

The fibrous reinforcing layer may be any suitable polymeric strands such as polyester filaments which will prevent the core tube from expanding under pressure and/or increase in temperature. Poly(alkylene terephthalate) ester fibers such as "Dacron" may be used. Polyamide or nylon filaments may be used. Preferably, the reinforcing layers are of the woven, braided or knitted type but a cord or filament may be helically wound in biased lapped layers about the core tube to form the reinforcement. If a solvent for the core tube is used to form an adhesive in situ from the core tube elastomer or if a solution of an adhesive material is applied to the core tube, there is penetration of the fibrous layer at least adjacent to the core tube. Electron radiation of the hose will effect cross-linking between the core tube and the fibrous layer to chemically bond the two together.

Figure 3:
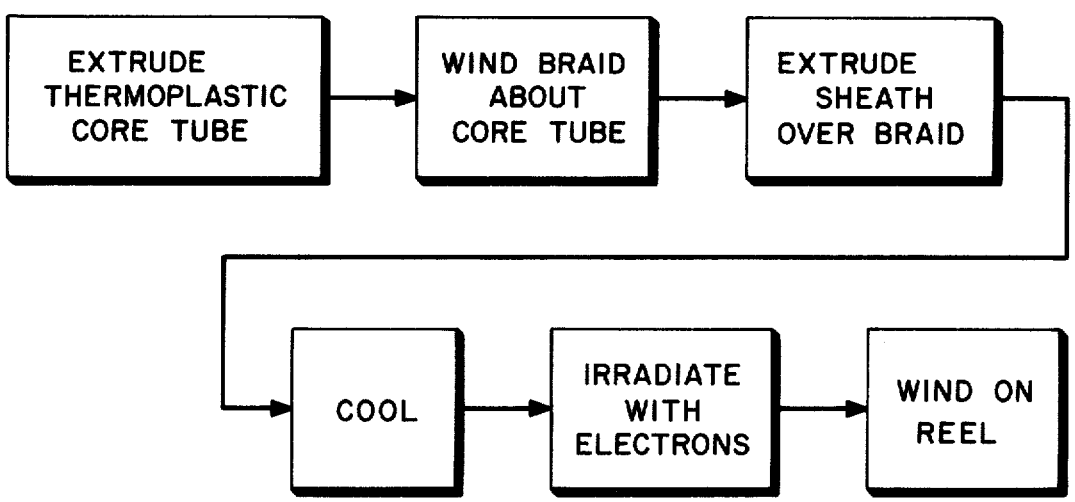
FIG. 3 is a diagramatic illustration of an embodiment of the process of the invention.

Referring now to the drawing, a hose 10 has a sheath 11, a thin walled core tube 13 and a woven fibrous reinforcing layer 12 wound tightly about the core tube at an angle of about 55° with the longitudinal axis of tube 13. As illustrated in FIG. 3, an unsaturated thermoplastic polyurethane composition is extruded to form a self supporting core tube 13. A reinforcing woven fibrous braid 12 comprising poly(alkylene terephthalate) ester fibers is wound at a tension of about 3 lbs. and an angle of about 55° about the core tube 13 and a sheath 11 of the same composition of the core tube 13 is extruded over the braid 12. The resulting hydraulic hose 10 is exposed to an electron beam of an electron accelerator operating at about 5 million electron volts until the dosage is from about 5 to 15 and preferably about 10 megarads to effect cross-linking of the thermoplastic core tube and sheath. The product is wound on a reel.

The temperature at which the irradiation step is carried out may be varied widely. For example, irradiations may be conducted in the range from low temperatures such as −80°C. up to just below the decomposition temperature of the elastomer, for example as high as 300°C. However, there is little advantage in employing extremes of temperature, and for reasons of convenience and economy, room temperature is preferred.

The process of this invention may be carried out in air, in the presence of inert atmospheres such as nitrogen or helium, or, if the reacting system is sufficiently non-volatile, in a partial vacuum. Operating in a vacuum, or at least under reduced pressure, is frequently desirable, since this lowers the number of collisions of the radiation particles with other gases that might be present, and thereby increases the efficiency of the irradiation.

Suitable poly($\epsilon$-caprolactone) glycol based urethane elastomer compositions for extruding to form core tube 13 or sheath 11 may be compounded by mixing together in parts by weight about 56 parts 4,4'-diphenylmethane diisocyanate, about 14.8 parts 1,4-butanediol and about 100 parts poly($\epsilon$-caprolactone) glycol having an equivalent weight of about 1,000 (Niax D560 sold by Union Carbide Corp.). The resulting mixture may be poured while still liquid in a tray and permitted to react to form a polyurethane adapted to be processed by thermoplastic methods. Compositions in which 1,4-butenediol is substituted for all or part, such as, about one-half of the butanediol may be similarly formulated to provide a urethane elastomer which is more susceptible to cross-linking by irradiation. The susceptibility of the composition to cross-linking by electron radiation may be increased by including various amounts of sensitizer, for example, from about 0.5 to 10 parts by weight m-phenylene dimaleimide, diethylene glycol dimethacrylate, diallyl maleate or other sensitizer per 100 parts of the urethane elastomer. The sensitizer may be added to the liquid mixture before solidification or it may be added as the urethane elastomer is processed prior to radiation. For example, a solid sensitizer may be added to the liquid mixture prior to solidification or dusted on the solid urethane elastomer any time before final extrusion.

A suitable filler such as carbon black N 330 may be mixed with the elastomer in amounts of up to 40 parts per 100 parts elastomer.

One example of a method of preparing a suitable polyurethane elastomer composition for extrusion to form core tube 13 or sheath 11 involves mixing about 100 parts by weight of a poly(epsilon-caprolactone) diol having a molecular weight of about 2,000 prepared from ethylene glycol and ε-caprolactone, about 7.4 parts 1,4-butanediol and about 7.3 parts 1,4-butene diol under substantially anhydrous conditions and heating the mixture to about 80°C under nitrogen. About 56 parts melted 4,4'-diphenylmethane diiscyanate are added quickly to the mixture of diols and the mixture is stirred vigorously for about 10 seconds with a mechanical mixer. The mixture is then poured into a dry tray heated to about 80°C. to a thickness of about one-fourth inch. The reacting mixture is then placed in an oven at 80°C. for about 20 minutes, removed from the oven and permitted to cool to room temperature of about 20°C. The cooled product is stored as a slab for about 1 week under nitrogen to age it. The aged polymer is granulated to form a product suitable for charging to an extruder. It may then be extruded into a core tube or sheath at about 380° to 390°F.

The effect of irradiation with ionizing electrons on the polymer of the core tube is illustrated in the following table:

TABLE 1

|  | 0 Mrad | 5 Mrad | 10 Mrad | 15 Mrad |
| --- | --- | --- | --- | --- |
| Tensile Strength (psi) | 8350 psi | 9180 psi | 9050 psi | 7200 psi |
| 50% Modulus | 819 psi | 791 psi | 985 psi | 1015 psi |
| Elongation | 500% | 450% | 400% | 300% |
| Comp. Set B a 212°F | 100.0% | 95.5% | 92.2% | — |
| Swell in DMF | dissolved | 121% | 85% | 80% |
| % DMF insolubles | 0% | 74.5% | 85.7% | 87.2% |

Another composition suitable for use in extruding a core tube 13 on sheath 11 may be prepared by mixing about 100 parts by weight of polyepichlorohydrin, about 25 parts chlorosulfonated polyethylene polymer (hypolon 45), about 40 parts Hi-Sil-EP (an inorganic reinforcing material sold by PPG Ind.), about 1 part anti-oxidant poly(trimethyl dihydro-quinoline) ("Agerite"), about 5 parts magnesium oxide, about 1 part Silane A1100 (a coupling agent used to couple Hi-Sil-EP and Hyprolon 45), and about 5 parts m-phenylene dimaleimide on a mill at a roll temperature of about 120°F. for about 15 minutes. The physical properties of the irradiated polymer are illustrated in Table 2.

TABLE 2

|  | Initial | 10 Mrad |
| --- | --- | --- |
| Tensile Strength | 512 psi | 1950 psi |
| 300% Modulus | 232 psi | 1290 psi |
| Ultimate Elongation | 450% | 450% |
| Hardness - Shore A | 70 | 80 |
| % Toluene Swell | Disint. | 53.4 |
| % Tensile Set from 100% Elongation: RT | 10.2 | 8.0% |
| 68°C. | 20.0 | 12.3% |

A polyester prepared from a dicarboxylic acid and a glycol such as adipic acid or the like and ethylene glycol or the like or a polyether glycol such as poly(tetramethylene ether) glycol having an average equivalent weight of about 1,000 may be substituted for poly(ε-caprolactone) glycol in the foregoing compositions.

Other suitable compositions for extruding core tube 13 or sheath 11 may be prepared by mixing in parts by weight about 100 parts polyepichlorohydrin or a copolymer with propylene oxide or with ethylene oxide (for example, "Hydrin" sold by B. F. Goodrich Co.) with about 25 parts of a highly crystalline Neoprene about 45 parts "HI-SIL," about 2 parts magnesium oxide, about 4 parts zinc oxide, about 1 part zinc stearate, with or without about 1.5 parts "Silane"-172 sold by Union Carbide Corporation and about 1 part "Agerite" antioxidant poly(trimethyl dihydro-quinoline) marketed by R. T. Vanderbilt Company.

Although the invention has been described in detail for the purpose of illustration, it is to be understood that such detail is solely for that purpose and that variations can be made by those skilled in the art without departing from the spirit and scope of the invention except as it may be limited by the claims.

The embodiments of the invention in which an exclusive property or privilege is claimed are defined as follows:

1. A flexible, dimensionally stable hydraulic hose comprising an extruded elastomeric core tube which has been cross-linked by irradiation with ionizing electrons, biased overlapping layers of reinforcing fibers tautly wound about the core tube in each direction at an angle of from about 50° to about 65° with the longitudinal axis of the core tube, said fibers covering at least about 85% of the surface thereof and preventing expansion of the core tube while the hose is conveying fluids at pressures above atmospheric.

2. The hydraulic hose of claim 1 wherein the core tube is an irradiated polyurethane composition.

3. The hydraulic hose of claim 1 having a sheath and wherein both the sheath and core tube have been exposed to irradiation with electrons.

4. The hydraulic hose of claim 1 having an electron irradiated cross-linked adhesive bonding the fibrous layer to the core tube.

5. The hydraulic hose of claim 4 wherein the adhesive is the elastomer of the core tube.

6. The hydraulic hose of claim 4 wherein the adhesive is a solvent activated elastomer of the core tube.

7. The hydraulic hose of claim 1 wherein the core tube is a chlorosulfonated polyethylene.

8. The core tube of claim 1 wherein the core tube is an ethylene-propylene-diene terpolymer.

9. The hydraulic hose of claim 1 wherein the core tube contains a reinforcing filler.

10. The hydraulic hose of claim 1 wherein said fibers are a synthetic resin and are bound to the core tube by cross-linking between the elastomer of the core tube and the resin of the fibers.

11. The hydraulic hose of claim 1 wherein the elastomer of the core tube contains a filler and has a Shore A hardness of greater than 45 and a tensile modulus of above 300 p.s.i.

12. The hydraulic hose of claim 1 wherein the overlapping layers of reinforcing fibers are lapped.

13. The hydraulic hose of claim 1 wherein the overlapping layers of reinforcing fibers are woven.

14. A flexible, dimensionally stable hydraulic hose comprising an extruded elastomeric core tube which has been crosslinked by irradiation with ionizing electrons, biased overlapping layers of reinforcing fibers tautly wound about the core tube in each direction at an angle of from about 50° to about 65° with the longitudinal axis of the core tube and preventing the expansion of the core tube while the hose is conveying fluids at pressures above atmospheric.

* * * * *